(12) United States Patent
Lee et al.

(10) Patent No.: US 8,501,004 B2
(45) Date of Patent: Aug. 6, 2013

(54) BALLAST WATER TREATMENT DEVICE

(75) Inventors: Soo-Tae Lee, Busan (KR); Tae-Sung Pyo, Busan (KR); Sang-Gyu Cheon, Gyeongsangnam-do (KR); Hyun-O Kim, Busan (KR); Su-Kyu Lee, Busan (KR)

(73) Assignee: Panasia Co., Ltd., Busan (KR)

( * ) Notice: Subject to any disclaimer, the term of this patent is extended or adjusted under 35 U.S.C. 154(b) by 432 days.

(21) Appl. No.: 12/914,568

(22) Filed: Oct. 28, 2010

(65) Prior Publication Data

US 2011/0100885 A1    May 5, 2011

(30) Foreign Application Priority Data

Oct. 29, 2009    (KR) .................. 10-2009-0103387

(51) Int. Cl.
*B01D 29/00*    (2006.01)
*B01D 35/00*    (2006.01)

(52) U.S. Cl.
USPC ............. 210/251; 210/85; 210/90; 210/98; 210/106; 210/108; 210/137; 210/741

(58) Field of Classification Search
USPC ............. 210/85, 90, 98, 106, 108, 137, 251, 210/741
See application file for complete search history.

(56) References Cited

U.S. PATENT DOCUMENTS
2008/0190826 A1    8/2008   Miner et al.

FOREIGN PATENT DOCUMENTS
KR    10-0765999 B1    10/2007
KR    10-0797186 B1    1/2008
KR    10-2009-0038571 A    4/2009

*Primary Examiner* — Dirk Bass
(74) *Attorney, Agent, or Firm* — Rabin & Berdo, P.C.

(57) ABSTRACT

Disclosed herein is a ballast water treatment device. The device includes a filtering unit filtering ballast water introduced into a ship using a filter, a vortex generating unit generating an artificial vortex in the ballast water filtered by the filtering unit, and an ultraviolet treatment unit having an ultraviolet lamp which sterilizes the ballast water discharged from the vortex generating unit using ultraviolet rays, thus preventing secondary contamination resulting from by-products, preventing a ballast tank from becoming contaminated, affording effective maintenance, and making it convenient to control. Further, an artificial vortex is formed in the ballast water when it is mixed, thus allowing a large quantity of ultraviolet rays to be radiated onto the ballast water passing through the ultraviolet treatment unit, therefore improving a sterilization effect.

12 Claims, 12 Drawing Sheets

BALLAST WATER TREATMENT DEVICE

BACKGROUND OF THE INVENTION

1. Field of the Invention

The present invention relates generally to a ballast water treatment device and, more particularly, to a ballast water treatment device which includes a filtering unit filtering ballast water introduced into a ship using a filter, a vortex generating unit generating an artificial vortex in the ballast water filtered by the filtering unit, and an ultraviolet treatment unit having an ultraviolet lamp which sterilizes the ballast water discharged from the vortex generating unit using ultraviolet rays, thus preventing secondary contamination resulting from by-products, preventing a ballast tank from becoming contaminated, affording effective maintenance, and making it convenient to control, and in which an artificial vortex is formed in the ballast water when it is mixed, thus allowing a large quantity of ultraviolet rays to be radiated onto the ballast water passing through the ultraviolet treatment unit, therefore improving a sterilization effect.

2. Description of the Related Art

After goods are unloaded from a ship, the ship does not rest sufficiently deep in the water, so that it is apt to lose its balance. Further, a propeller or the like is not sufficiently immersed in the water, so that the propeller does not operate efficiently. Thus, in order for the ship to maintain its balance while sailing without goods, seawater is put into a tank of the ship. Such seawater is called ballast water. The increasing volume of internal trade has led to an increase in the ratio of marine transportation using a ship that can transport a large amount of goods, and the size of the ship also has been increasing rapidly. Thus, the volume of ballast water used in the ship is also increasing considerably. As the volume of the ballast water used in the ship increases, the damage done to the endemic marine ecosystem resulting from it being attacked by exotic marine organism species is also increasing. In order to solve the international environmental contamination problem, the Internal Maritime Organization (IMO) completed the 'International treaty concerning control and management of ballast water and sediment of ships' in 2004, which is effective from 2009.

As a conventional method of treating ballast water, a land treatment method was used but is ineffective. Thus, a method of installing a ballast water treatment system in a ship has been widely used. The ballast water treatment system mainly uses filtering, heat treatment, chemical treatment, electrolysis, ozone treatment or ultraviolet ray radiation, etc.

However, the heat treatment is problematic in that it is difficult to treat microorganisms or inorganic sources of contamination which are resistant to heat. The chemical treatment is problematic in that secondary contamination may occur after ballast water has been treated. Further, the electrolysis or ozone treatment is problematic in that an explosion may be caused by a short circuit and it is inefficient to manage. Especially, the filtering is problematic in that sediment must be removed from a filter and the operation of treating ballast water must be halted when the sediment is being removed. Further, the ultraviolet ray radiation is problematic in that its efficiency is low because of foreign substances adhering to the surface of a sleeve which surrounds an ultraviolet lamp. Furthermore, when each of the above methods is individually used, it is difficult to completely treat ballast water. Meanwhile, if all of the above methods are used together, treatment is expensive, so that it is inefficient.

SUMMARY OF THE INVENTION

Accordingly, the present invention has been made keeping in mind the above problems occurring in the prior art, and an object of the present invention is to provide a ballast water treatment device, which uses a method of physically filtering ballast water using a filter and a method of sterilizing the ballast water using ultraviolet rays in combination, thus preventing secondary contamination resulting from by-products, preventing a ballast tank from becoming contaminated, affording effective maintenance, and making it convenient to control.

Another object of the present invention is to provide a ballast water treatment device, which includes a vortex generating unit between a filtering unit and an ultraviolet treatment unit to generate an artificial vortex in ballast water fed from the filtering unit and thus allow the ballast water to be uniformly mixed, thus enabling a large quantity of ultraviolet rays to be radiated onto the ballast water which is passing through the ultraviolet treatment unit, therefore improving a sterilization effect.

A further object of the present invention is to provide a ballast water treatment device, which includes a vortex generating unit that uniformly mixes the ballast water and thus improves a sterilization effect, thus enabling a distance between the center of a filter and the center of an ultraviolet lamp to be set to 1.5 m or less, therefore realizing the miniaturization of the ballast water treatment device and minimizing the area in which the device is installed.

Yet another object of the present invention is to provide a ballast water treatment device, in which an ultraviolet treatment unit includes a protective screen to generate a vortex in the ballast water entering the ultraviolet treatment unit, thus enabling a large quantity of ultraviolet rays to be radiated onto the ballast water so as to improve a sterilization effect, and thus removing foreign substances such as a shell from the ballast water so as to protect a sleeve which surrounds an ultraviolet lamp.

A still further object of the present invention is to provide a ballast water treatment device, which further includes a bypass duct between a filtering unit and a vortex generating unit so that ballast water passes through only either of the filtering unit or the ultraviolet treatment unit to be treated, as necessary.

An additional object of the present invention is to provide a ballast water treatment device, which allows a filtering unit or an ultraviolet treatment unit to be automatically washed, thus always maintaining uniform performance, and affording efficient maintenance.

Another object of the present invention is to provide a ballast water treatment device, which allows a filtering unit or an ultraviolet treatment unit to be automatically washed without stopping treating ballast water, thus increasing treatment efficiency, therefore being efficient in terms of treatment time and cost.

Another object of the present invention is to provide a ballast water treatment device, which is constructed to allow an automatic washing unit of a filtering unit to simultaneously perform vertical movement and rotary movement, thus increasing the washing ability of a filter.

In order to accomplish the above objects, the present invention provides the embodiments having the following construction.

According to an embodiment of the present invention, a ballast water treatment device includes a filtering unit filtering ballast water introduced into a ship using a filter, a vortex generating unit generating an artificial vortex in the ballast water filtered by the filtering unit, and an ultraviolet treatment unit having an ultraviolet lamp which sterilizes the ballast water discharged from the vortex generating unit using ultraviolet rays. Thereby, the ballast water is uniformly mixed by the vortex generated by the vortex generating unit, so that a sterilization effect is enhanced, and a distance between the filtering unit and the ultraviolet treatment unit is reduced, so that compactness of the ballast water treatment device is realized.

According to another embodiment of the present invention, the ballast water treatment device may further include a protective screen which generates a vortex in ballast water and removes foreign substances from the ballast water, thus protecting the ultraviolet treatment unit. The protective screen may be provided on a front end of the ultraviolet treatment unit.

According to a further embodiment of the present invention, the protective screen may include a mesh net formed by crossing lateral and longitudinal ribs with each other, and the lateral and longitudinal ribs may be placed obliquely at a predetermined angle to collide with the ballast water which flows in a body of the ultraviolet treatment unit, thus changing a direction in which the ballast water moves, therefore generating a vortex.

According to another embodiment of the present invention, the filtering unit may include a body having an inlet and an outlet to permit inflow and outflow of ballast water, a filter filtering the ballast water which flows in the body, and an automatic washing unit washing away foreign substances from the filter.

According to another embodiment of the present invention, the automatic washing unit may include a driving unit driving the automatic washing unit, a suction unit connected to the driving unit to be moved by the driving unit and sucking the foreign substances from the filter, and an exhaust unit discharging the foreign substances which have been sucked by the suction unit.

According to another embodiment of the present invention, the driving unit may include a driving motor providing power to actuate the automatic washing unit, and a driving shaft connected to the driving motor. The suction unit may include a suction rod sucking foreign substances from the filter, and a core connected to the suction rod to move the sucked foreign substances and connected to the driving unit. The exhaust unit may include a flushing chamber storing foreign substances which are discharged through an exhaust hole formed in a first end of the core, an exhaust pipe serving as a passage which discharges the foreign substances from the flushing chamber, and an exhaust valve provided at a predetermined position of the exhaust pipe. Thereby, the foreign substances adhering to the filter may be automatically sucked and discharged using a difference in pressure when the exhaust valve is open and closed.

According to another embodiment of the present invention, the driving shaft may have thread, and the suction rod may be radially connected to the core, so that the suction unit may be moved up and down while being rotated by an operation of the driving unit, thus allowing the foreign substances to be more efficiently sucked from the filter.

According to another embodiment of the present invention, the vortex generating unit may include a body having an inlet and an outlet to permit inflow and outflow of ballast water and a locking step protruding from an inner circumference of the body, and a vortex generator supported by the locking step and generating a vortex in the ballast water which flows in the body. The vortex generator may include a frame defining an outer support and coupled to the locking step, and a plurality of blades formed by cutting a surface which is on the same plane as the frame to a predetermined radius and bending the cut surface in a predetermined direction.

According to another embodiment of the present invention, the vortex generating unit may include a body having an inlet and an outlet to permit inflow and outflow of ballast water, and a plurality of blades provided on an inner circumference of the body in such a way as to be inclined at a predetermined angle, so that the ballast water flowing in the body may collide with the blades, thus generating a vortex.

According to another embodiment of the present invention, the ultraviolet treatment unit may include a body having an inlet and an outlet to permit inflow and outflow of ballast water, an ultraviolet lamp unit having an ultraviolet lamp which radiates ultraviolet rays onto the ballast water flowing in the body, and a washing unit removing foreign substances from the ultraviolet lamp unit.

According to another embodiment of the present invention, the washing unit may include a wiper wiping an outer circumference of the ultraviolet lamp unit, a driving shaft connected to the wiper, and a driving motor connected to the driving shaft to actuate the driving shaft.

According to another embodiment of the present invention, the ultraviolet treatment unit may further include an ultraviolet intensity meter measuring intensity of ultraviolet rays emitted from the ultraviolet lamp, and a temperature sensor measuring internal temperature of the body.

According to another embodiment of the present invention, the ballast water treatment device may further include a bypass duct provided between the filtering unit and the vortex generating unit so that ballast water may pass through only either of the filtering unit or the ultraviolet treatment unit to be treated, as necessary.

According to another embodiment of the present invention, the ballast water treatment device may further include a display unit displaying an operation of the ballast water treatment device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
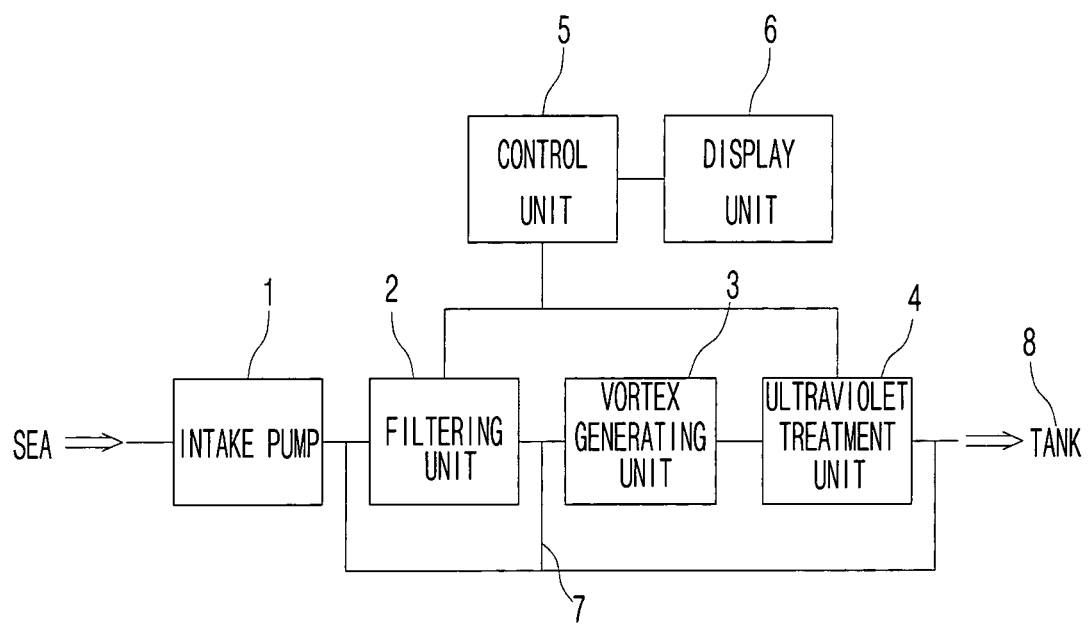
FIG. 1 is a block diagram showing a ballast water treatment device according to an embodiment of the present invention.

Hereinafter, a ballast water treatment device according to the present invention will be described in detail with reference to the accompanying drawings. The same reference numerals are used throughout the different drawings to designate the same components. Further, when it is determined that the detailed description of the known function and construction may obscure the gist of the present invention, the detailed description will be omitted.

Figure 2:
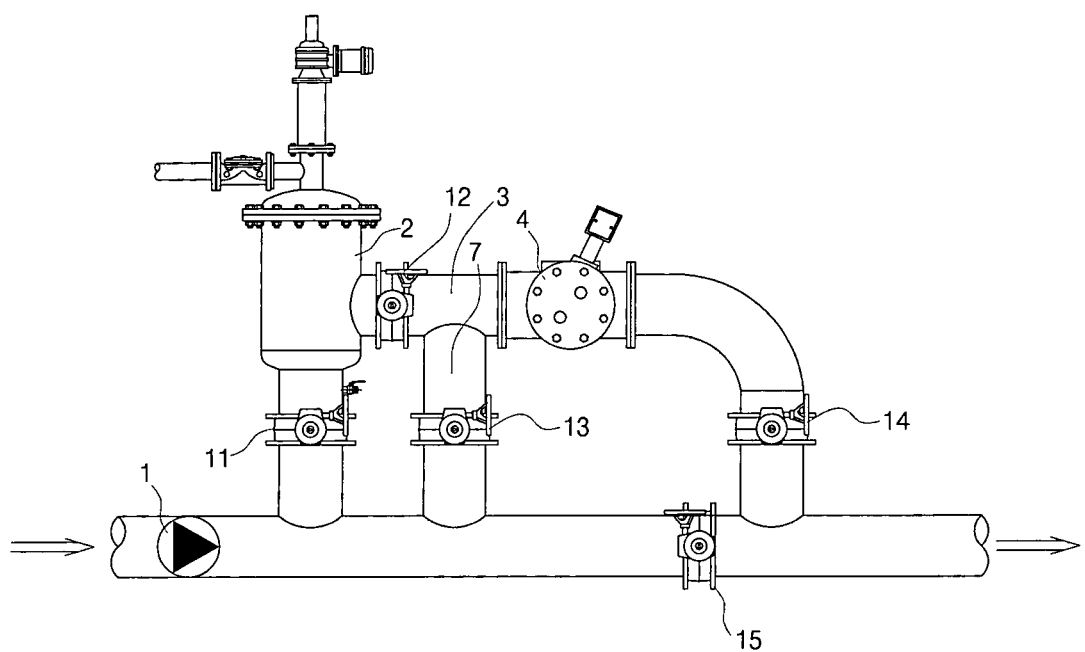
FIG. 2 is a view showing the coupling relation between a filtering unit, a vortex generating unit and an ultraviolet treatment unit of the ballast water treatment device according to an embodiment of the present invention.
Figure 3:
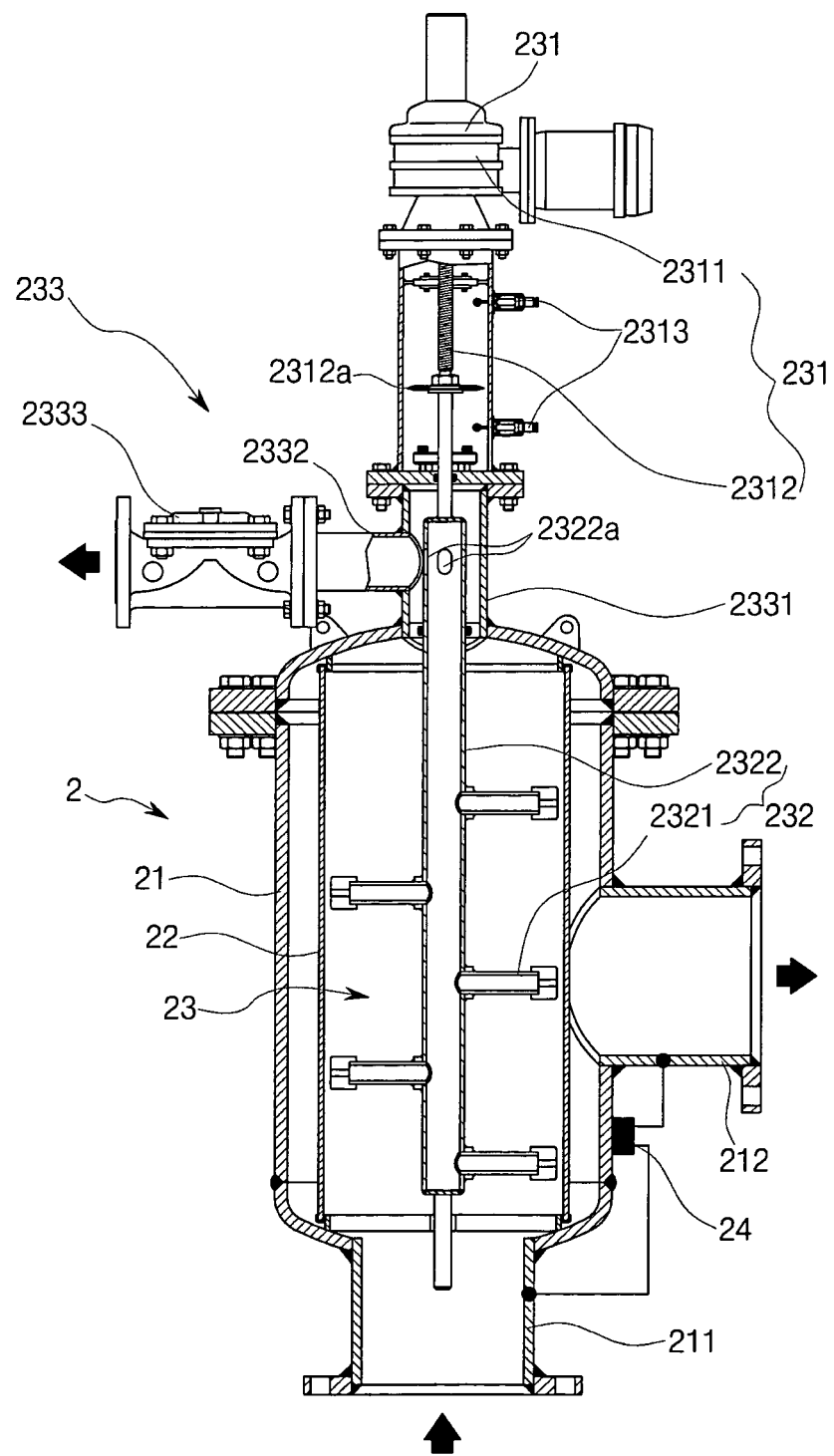
FIG. 3 is a sectional view showing a filtering unit of the ballast water treatment device according to an embodiment of the present invention.
Figure 4:
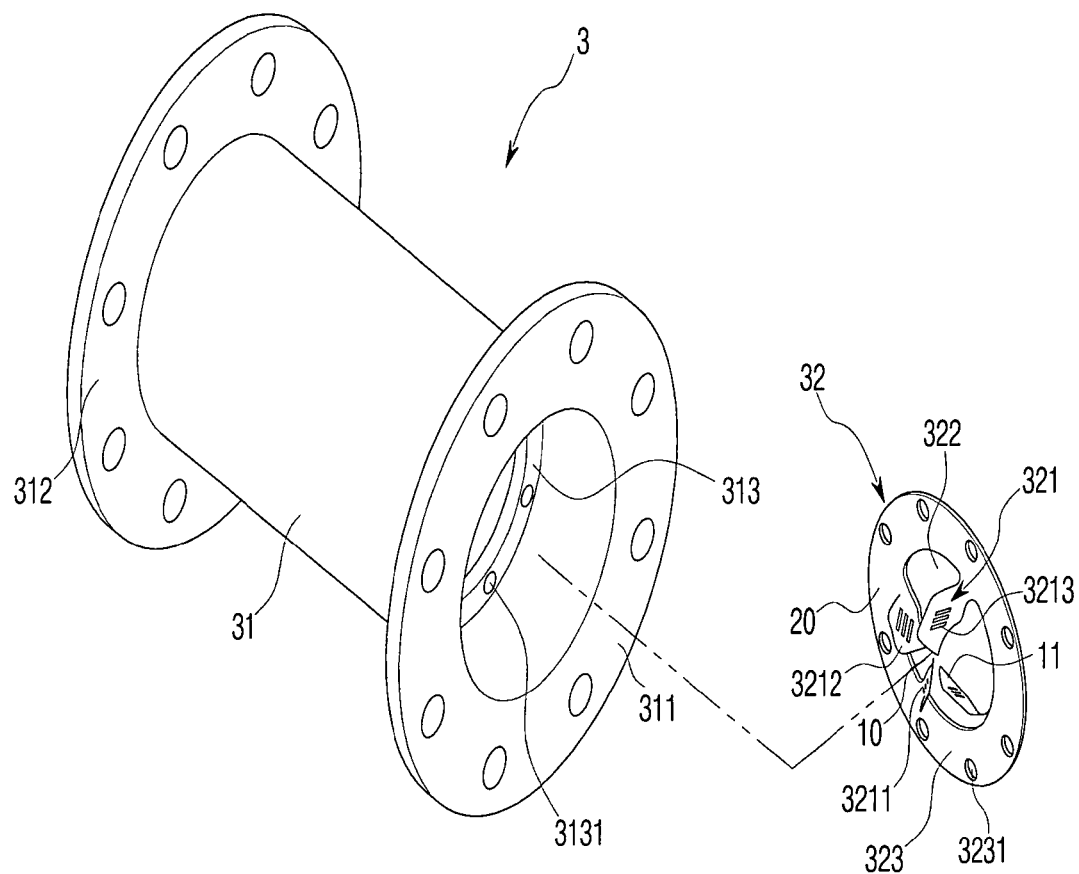
FIG. 4 is an exploded perspective view showing a vortex generating unit according to an embodiment of the present invention.
Figure 5:
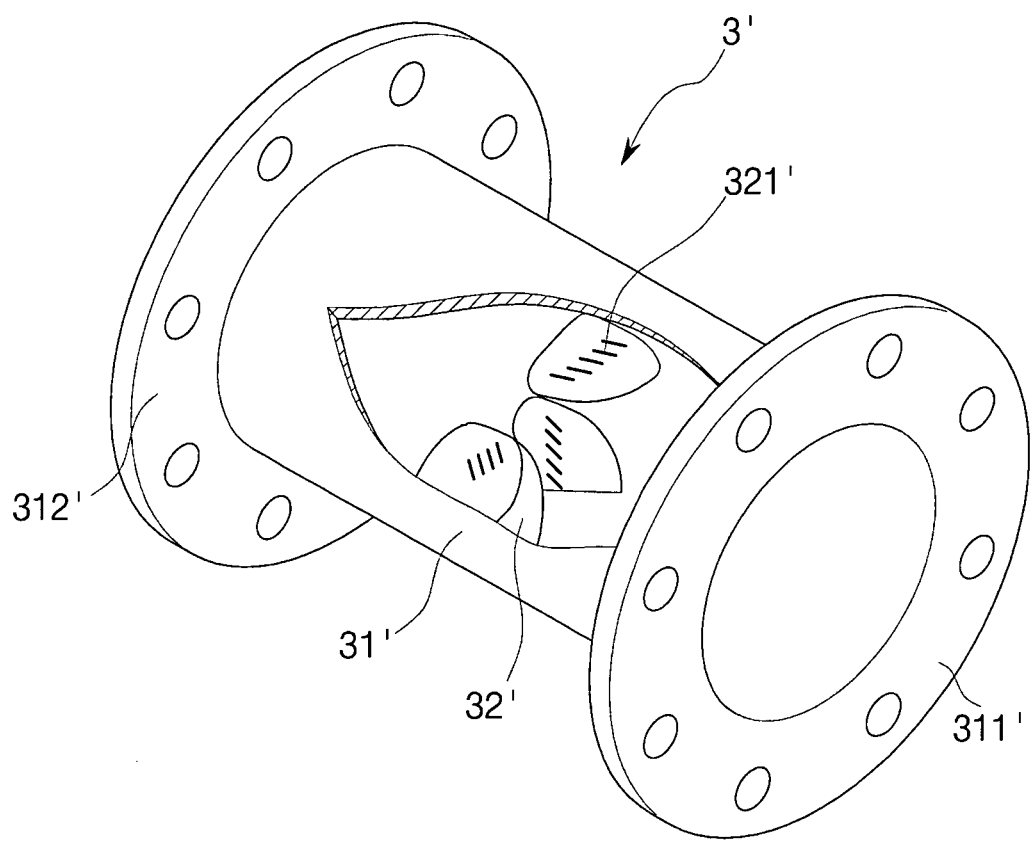
FIG. 5 is a partially cutaway perspective view showing a vortex generating unit according to another embodiment of the present invention.
Figure 6:
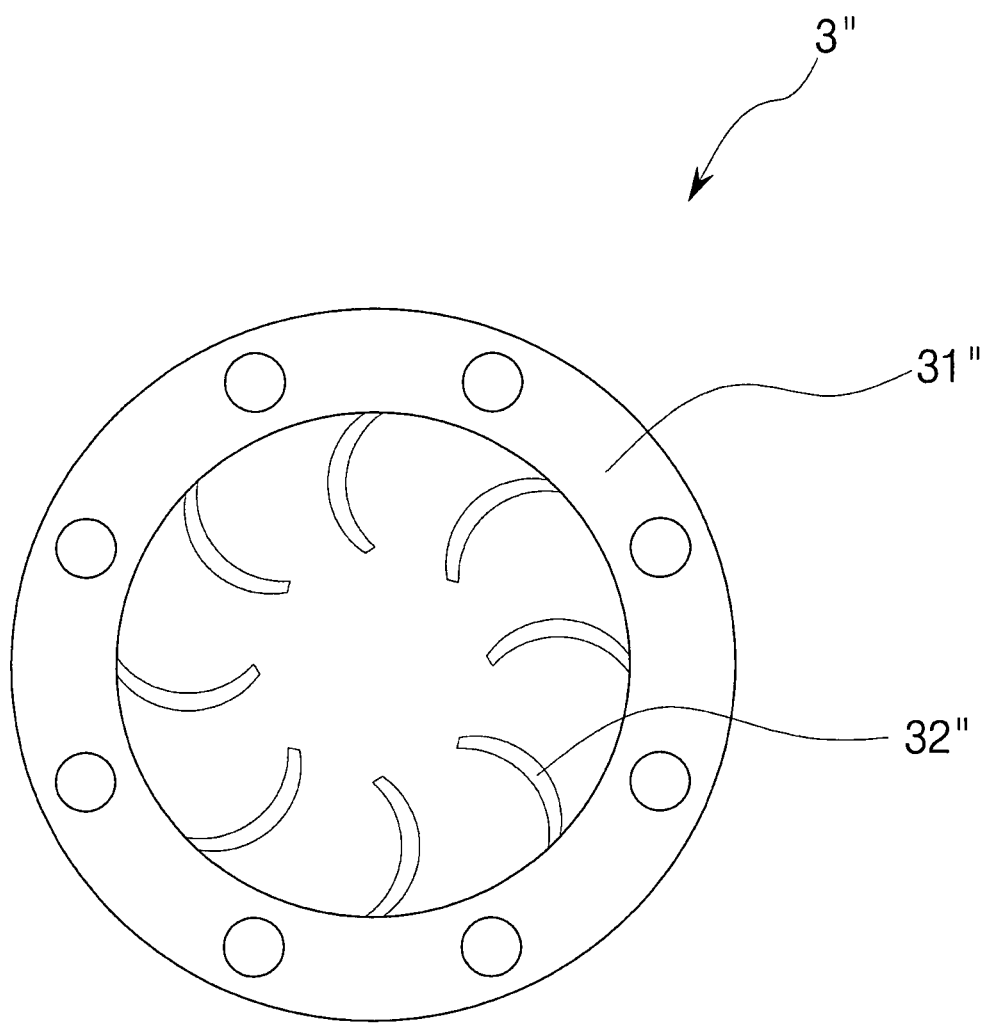
FIG. 6 is a side view showing a vortex generating unit according to a further embodiment of the present invention.
Figure 7:
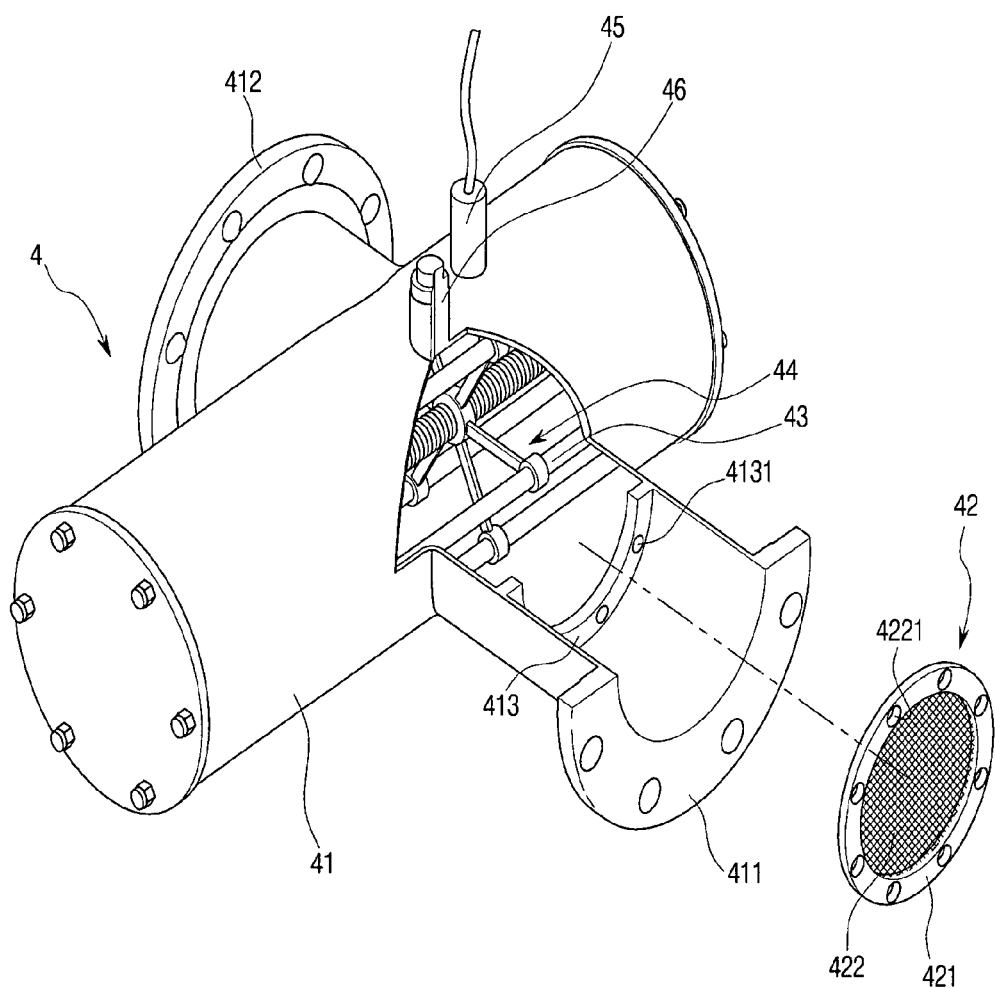
FIG. 7 is a partially cutaway exploded perspective view showing an ultraviolet treatment unit of the ballast water treatment device according to an embodiment of the present invention.
Figure 8:
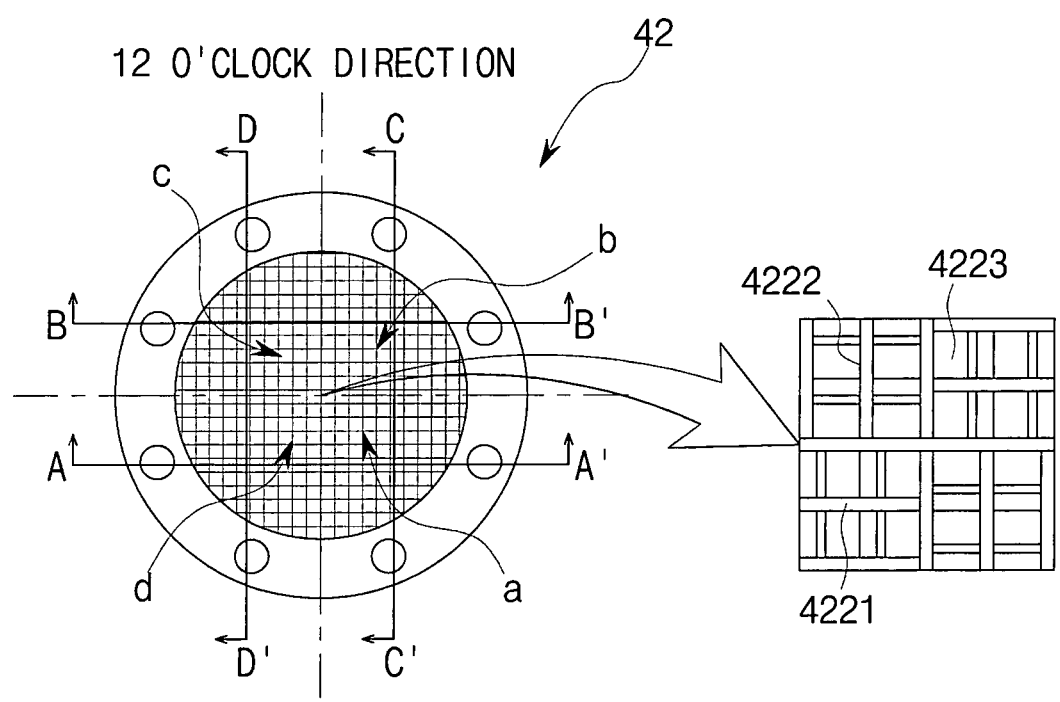
FIG. 8 is a side view showing a protective screen according to an embodiment of the present invention.
Figure 9:
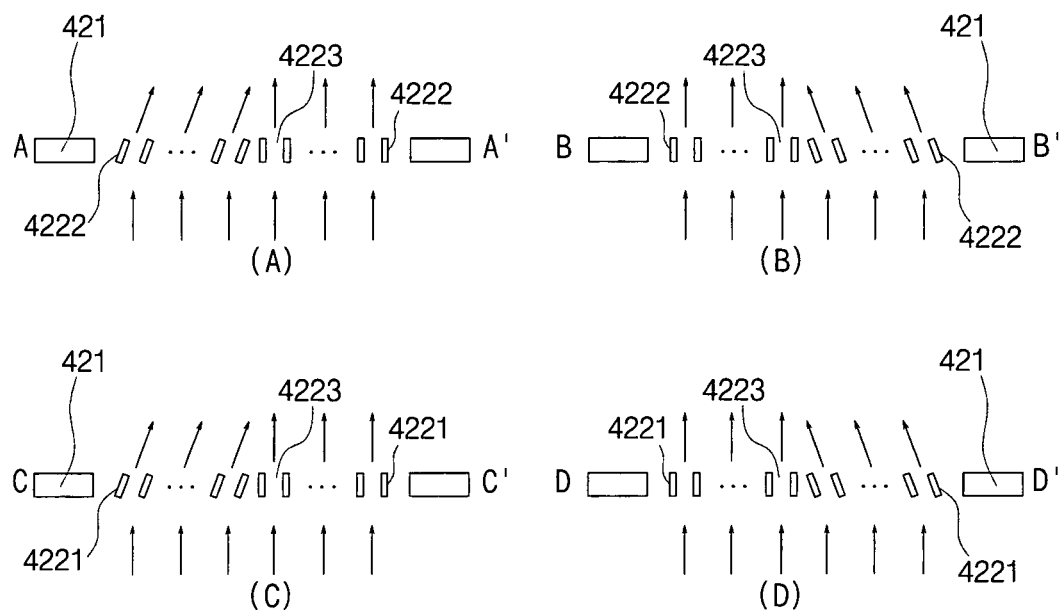
FIGS. 9A to 9D are sectional views taken along lines A-A', B-B', C-C', and D-D' of FIG. 8.
Figure 10:
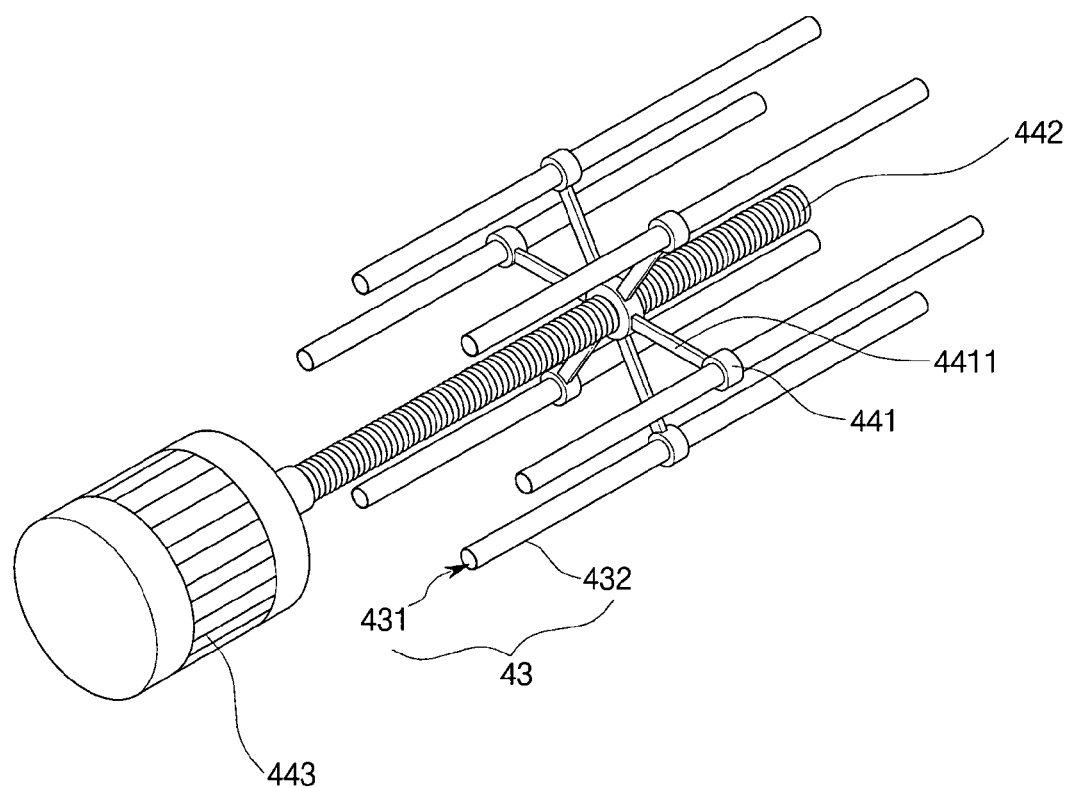
FIG. 10 is a perspective view showing a washing unit of the ultraviolet treatment unit.
Figure 11:
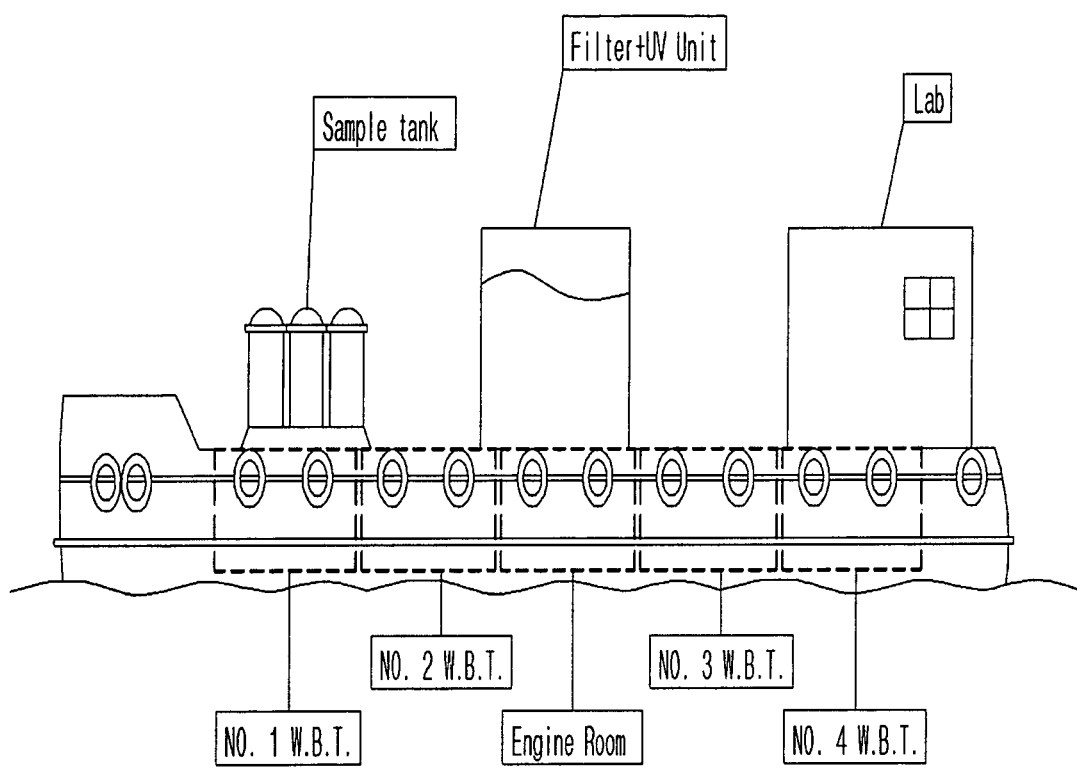
FIG. 11 is a view showing a barge with experimental equipment.
Figure 12:
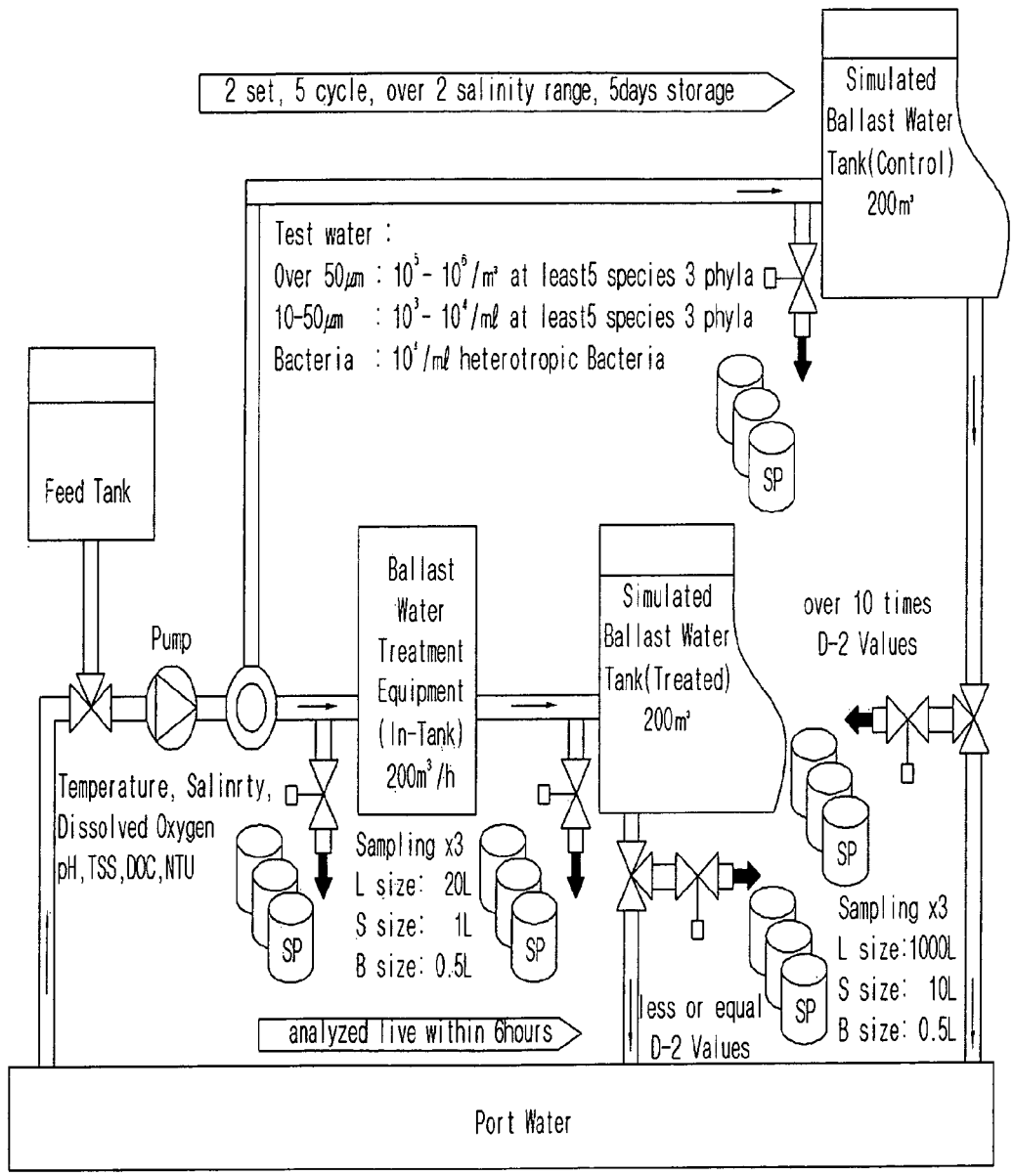
FIG. 12 is an experimental setup diagram.

FIG. 1 is a block diagram showing a ballast water treatment device according to an embodiment of the present invention, FIG. 2 is a view showing the coupling relation between a filtering unit, a vortex generating unit and an ultraviolet treatment unit of the ballast water treatment device according to an embodiment of the present invention, FIG. 3 is a sectional view showing a filtering unit of the ballast water treatment device according to an embodiment of the present invention, FIG. 4 is an exploded perspective view showing a vortex generating unit according to an embodiment of the present invention, FIG. 5 is a partially cutaway perspective view showing a vortex generating unit according to another embodiment of the present invention, FIG. 6 is a side view showing a vortex generating unit according to a further embodiment of the present invention, FIG. 7 is a partially cutaway exploded perspective view showing an ultraviolet treatment unit of the ballast water treatment device according to an embodiment of the present invention, FIG. 8 is a side view showing a protective screen according to an embodiment of the present invention, FIGS. 9A to 9D are sectional views taken along lines A-A', B-B', C-C', and D-D' of FIG. 8, FIG. 10 is a perspective view showing a washing unit of the ultraviolet treatment unit, FIG. 11 is a view showing a barge with experimental equipment, and FIG. 12 is an experimental setup diagram.

Referring to FIGS. 1 and 2, a ballast water treatment device according to an embodiment of the present invention includes a filtering unit 2, a vortex generating unit 3, an ultraviolet treatment unit 4, and a control unit 5. The filtering unit 2 filters ballast water, which is taken from an intake pump 1 of a ship, using a filter. The vortex generating unit 3 generates an artificial vortex in the ballast water filter by the filtering unit 2. The ultraviolet treatment unit 4 sterilizes the ballast water discharged from the vortex generating unit 3, using ultraviolet rays. The control unit 5 controls the overall operation of the filtering unit 2 and the ultraviolet treatment unit 4.

The filtering unit 2 functions to filter the ballast water taken from the intake pump 1 of the ship, using the filter. Referring to FIG. 3, the filtering unit 2 includes a body 21, a filter 22, an automatic washing unit 23, and a pressure sensor 24. The body 21 has an inlet 211 and an outlet 212 to permit the inflow and outflow of the ballast water. The filter 22 filters the ballast water which flows in the body 21. The automatic washing unit 23 functions to wash away foreign substances adhering to the filter 22. The pressure sensor 24 measures pressure at the inlet 211 and the outlet 212.

The body 21 defines the body of the filtering unit 2, and may preferably have the shape of a cylinder that has a space therein. The body 21 includes the inlet 211 into which the ballast water put into the ship is introduced, and the outlet 212 through which filtered ballast water is discharged. According to the present invention, as will be described below, a filtering operation is performed using the filter 22 which is provided to surround the interior of the body 21. Thus, it is preferable that the inlet 211 be located at a lower position of the body 21 and the outlet 212 be located above the inlet 211 so that ballast water flowing to the lower portion of the body 21 is filtered while filling the interior of the body 21.

The filter 22 functions to filter the ballast water introduced into the body 21 through the inlet 211, and may preferably have a cylindrical shape along the inner circumference of the body 21 to surround the interior of the body 21. Thus, in order to discharge the ballast water, which flows through the inlet 211 into the body 21, through the outlet 212, the ballast water must necessarily pass through the filter 22. While the ballast water is filtered by the filter 22, organisms and particles having size over 50 μm are removed. In the case of continuously performing the filtering operation, foreign substances accumulate in the inner surface of the filter 22, so that the filtering function is deteriorated and thus the operation of removing foreign substances is performed by the automatic washing unit 23 that will be described below.

The automatic washing unit 23 serves to automatically remove foreign substances from the filter 22 under the control of the control unit 5 using a difference in pressure between the inside and the outside of the filter 22. The automatic washing unit 23 includes a driving unit 231, a suction unit 232, and an exhaust unit 233. The driving unit 231 drives the automatic washing unit 23 in response to a signal of the control unit 5. The suction unit 232 is connected to the driving unit 231 to be moved by the driving unit 231, and sucks foreign substances adhering to the filter 22. The exhaust unit 233 functions to discharge foreign substances from the suction unit 232.

The driving unit 231 serves to provide the power that operates the automatic washing unit 23, and includes a driving motor 2311, a driving shaft 2312, and limit switches 2313.

The driving motor 2311 provides the power that operates the automatic washing unit 23, and may comprise a general motor. The driving motor 2311 is automatically operated under the control of the control unit 5.

The driving shaft 2312 connects a core that will be described below with the driving motor 2311, and vertically moves and rotates the core by the operation of the driving motor 2311. Particularly, the outer circumference of one end of the driving shaft 2312 connected to the driving motor 2311 may have the shape of thread. This allows the driving shaft 2312 to move up and down and rotate as the driving motor 2311 is operated, thus more efficiently sucking foreign substances from the filter 22. Further, a contact means 2312a is provided on a predetermined portion of the driving shaft 2312. The contact means 2312a comes into contact with the limit switches 2313 that will be described below and limit the vertical moving distance of the driving shaft 2312, and may comprise a disc-shaped rubber member or metal member. When the contact means 2312a is in contact with each limit switch 2313, the moving direction of the driving shaft 2312 changes under the control of the control unit 5, so that the driving shaft 2312 moves up and down between the limit switches 2313.

A pair of limit switches 2313 is located at an upper position in the body 21. When the contact means 2312a comes into contact with each limit switch 2313, the direction in which the driving shaft 2312 moves is changed. Thus, the driving shaft 2312 vertically moves for a distance between the limit switches 2313.

The suction unit 232 is connected to the driving unit 231 and is moved to suck foreign substances from the filter 22.

The suction unit 232 includes suction rods 2321 which suck foreign substances from the filter 22 foreign substances, and a core 2322 which is connected to the suction rods 2321 to move the sucked foreign substances.

Each suction rod 2321 functions to suck foreign substances from the inner surface of the filter 22, and has the shape of a rod or bar which has a through hole therein. One end of the suction rod 2321 is in close contact with the inner surface of the filter 22 to suck foreign substances from the inner surface of the filter 22. Preferably, in order to increase the force of suction, the diameter of the through hole of one end of the suction rod 2321 is small. Further, the other end is connected to the core 2322 to move the sucked foreign substances to the core 2322. Further, a plurality of suction rods 2321 may be radially attached to the outer circumference of the core 2322 in such a way as to be located at different heights. This enables foreign substances attached circumferentially and axially to the filter 22 to be more easily removed when the core 2322 rotates and moves up and down, thus allowing the entire filter to be washed. The principle wherein the suction rods 2321 suck foreign substances from the filter 22 uses the flow of ballast water caused by a difference in pressure between high pressure in the filter 22 and low pressure in each suction rod 2321 or the core 2322, which will be described below in detail.

The core 2322 is connected to the suction rods 2321 to move the sucked foreign substances. The core 2322 may have the shape of a rod or bar which is hollow therein, and the suction rods 2321 are radially attached to the outer circumference of the core 2322. Thereby, the foreign substances sucked through the suction rods 2321 may move through the internal space of the core 2322. Exhaust holes 2322a are formed in one end of the core 2322 so that foreign substances flowing through the internal space are discharged to the flushing chamber 2331 of the exhaust unit 233. Further, one end of the core 2322 is connected to the driving shaft 2312, so that the core 2322 may perform rotary movement as well as vertical movement when the driving shaft 2312 moves. The principle of moving foreign substances in the core 2322 uses the flow of ballast water caused by a difference in pressure between high pressure in the filter 22 and low pressure in each suction rod 2321 or the core 2322, which will be described below in detail.

The exhaust unit 233 functions to discharge foreign substances from the suction unit 232. The exhaust unit 233 includes a flushing chamber 2331, an exhaust pipe 2332, and an exhaust valve 2333. The flushing chamber 2331 stores foreign substances which are discharged through the exhaust holes 2322a formed in one end of the core 2322. The exhaust pipe 2332 is the passage through which the foreign substances of the flushing chamber 2331 are discharged. The exhaust valve 2333 is formed at a position of the exhaust pipe 2332.

The flushing chamber 2331 is the part in which foreign substances discharged through the exhaust holes 2322a of the core 2322 accumulate. Preferably, the size and shape of the flushing chamber 2331 are set in consideration of the distance the core 2322 moves up and down so that the flushing chamber 2331 may store foreign substances discharged from the exhaust holes 2322a of the core 2322 in any circumstance.

The exhaust pipe 2332 is the passage through which the foreign substances of the flushing chamber 2331 are discharged, and may have the shape of a pipe which is connected to a side of the flushing chamber 2331.

The exhaust valve 2333 is connected to a side of the exhaust pipe 2332 and provides the suction force that sucks foreign substances from the filter 22 and discharges them. The exhaust valve 2333 is controlled by the control unit 4. That is, when the exhaust valve 2333 is open, the interiors of the exhaust pipe 2332, the flushing chamber 2331, the core 2322 and the suction rods 2321 have atmospheric pressure, that is, are at a pressure lower than the high pressure in the filter 22. The ballast water inside the filter 22 is sucked into the suction rods 2321 which are at low pressure. At this time, foreign substances adhering to the filter 22 are also sucked. Meanwhile, when the exhaust valve 2333 is closed, the suction of ballast water and foreign substances is stopped. The whole operating principle will be described below.

The pressure sensor 24 is used to measure pressure inside and outside the filter 22, and may comprise general pressure measuring sensors. If a difference in pressure between the inside and outside of the filter 22 measured by the pressure sensor 24 exceeds a predetermined range, the operation of the automatic washing unit 23 for removing foreign substances from the filter 22 is started under the control of the control unit 4.

The operating principle of the filtering unit 2 including the above components will be described below in detail. First, ballast water flowing through the inlet 211 into the body 21 is filtered by the filter 22 and then is discharged through the outlet 212. At this time, if foreign substances filtered by the filter 22 adhere to the inner surface of the filter 22, the internal pressure of the filter 22 measured by the pressure sensor 24 increases. If the increment exceeds a predetermined range, the automatic washing unit 23 is operated under the control of the control unit 4. If the control unit 4 operates the driving motor 2311, the driving shaft 2312, the core 2322 and the suction rods 2321 perform vertical movement and rotary movement. Further, if the control unit 4 opens the exhaust valve 2333, the internal pressure of each suction rod 2321 is lower than the internal pressure of the filter 22, so that ballast water and foreign substances in the filter 22 are sucked through the suction rods 2321, and then are discharged through the core 2322, the flushing chamber 2331 and the exhaust pipe 2332. Further, if the internal pressure of the filter 22 is decreased below a predetermined range, the automatic washing unit 23 stops operating. One of the important features of the ballast water treatment device according to the present invention is that the filter 22 of the filtering unit 2 can continue the filtering operation even while the automatic washing unit 23 is operating.

The vortex generating unit 3 functions to generate vortex in ballast water which is filtered by the filtering unit 2. Referring to FIG. 4, the vortex generating unit 3 includes a body 31 in and out of which ballast water flows, and a vortex generator 32 which is coupled to the interior of the body 31 to generate a vortex in the ballast water flowing in the body 31.

The body 31 defines the body of the vortex generating unit 3, and may preferably have the shape of a cylinder that has a space therein. The body 31 includes an inlet 311 into which ballast water flows, an outlet 312 through which ballast water having a vortex is discharged, and a locking step 313 which is provided between the inlet 311 and the outlet 312 in such a way as to protrude from the inner circumference of the body 31 and is coupled to the vortex generator 32 that will be described below.

The locking step 313 protrudes from the inner circumference of the body 31, is coupled to the vortex generator 32 which will be described below, and has fastening holes 3131 so that screws can fasten it to the vortex generator 32.

The vortex generator 32 is coupled to a surface of the locking step 313 which is located at the ballast-water inlet side of the body 31, using screws or by welding, and generates a vortex in ballast water flowing in the body 31. The vortex generator 32 includes a plurality of blades 321 which are formed by cutting a portion from the central portion of a circular metallic thin plate to a predetermined radius and bending the portion in the form of a propeller, a through hole 322 which is formed in the metallic thin plate as a result of the formation of the blades 321, and a frame 323 which is provided around the blades 321.

The blades 321 are formed in the central portion of the frame 323, and are formed by cutting a surface of a predetermined radius corresponding to the through hole 322 in such a way as to be connected to the frame 323 and bending the surface in the form of a propeller in such a way as to have the same inclination. Each blade 321 includes a neck 3211 which is connected to the frame 323 and bent at a predetermined angle, and a blade face 3212 which extends from the neck 3211 to the center of the through hole 322, protrudes in such a way as to be inclined at a predetermined angle in the direction in which ballast water flows, and has the shape of a curved surface. The angle of the blade face 3212 is inclined at an angle of 20° to 40° in the direction in which ballast water flows. A plurality of slits 3213 is formed in the blade face 3212 to prevent the neck 3211 from being easily damaged when excessive pressure is exerted on the blade 321 by the ballast water flowing in and out. The ballast water flowing in the body 31 collides with the blade 321 and rotates in a direction in which the blade 321 is inclined, thus, generating a vortex. The generation of the vortex in the ballast water which flows into the vortex generating unit 3 will be described below in detail.

The through hole 322 is a hole formed in the metallic thin plate when the blades 321 are formed, and makes the ballast water flowing into the body 31 pass through the vortex generator 32.

The frame 323 is provided around the blades 321 in a circular shape, and is coupled to the locking step 313. Fastening holes 3231 are formed in the frame 323 so that the frame 323 can be fastened to the locking step 313 by screws.

The principle used to generate a vortex in the ballast water flowing into the vortex generating unit 32 using the vortex generating unit 3 constructed as described above is as follows. That is, the ballast water passing through the filtering unit 2 flows through the inlet 311 into the body 31 of the vortex generating unit 3. The ballast water introduced into the body 31 passes through the vortex generator 32 while flowing to the outlet 312. The ballast water passing through the through hole 322 of the vortex generator 32 collides with the blades 321, so that the direction in which the ballast water flows is changed in the direction in which the blades 321 are inclined. Since the blades 321 are formed in the shape of a propeller, the ballast water colliding with the blades 321 is rotated and a vortex is generated. The ballast water in which the vortex is formed is discharged out through the outlet 312 and enters the ultraviolet treatment unit 4. Since a vortex is formed in the ballast water, the ballast water moves while swirling. Thus, the ballast water mixes well, so that a large quantity of ultraviolet rays is uniformly radiated onto the ballast water entering the ultraviolet treatment unit 4 and thus the ballast water treatment device has a high sterilization effect. Further, if a large pressure is exerted on the blades 321 colliding with the ballast water, so that the blades 321 are damaged, the vortex generator 32 can be easily replaced by a new one because the vortex generator 32 is detachably attached to the body 31 in a screw-type fastening method. Therefore, the maintenance of the vortex generator 32 can be easily performed.

Further, the ballast water is uniformly mixed by vortex, so that the length of a pipe from the filtering unit 2 to the ultraviolet treatment unit 4 can be reduced, and thus the compactness of the device is achieved.

A ballast water treatment device according to another embodiment of the present invention will be described with reference to FIG. 5. A vortex generating unit 3' includes a body 31' in and out of which ballast water flows, and blades 32' which are formed in the body 31' to generate a vortex in the ballast water flowing in the body 31'.

The body 31' is equal to the body 31 of the vortex generating unit 3 shown in FIG. 4 except that the blades 32' are coupled to the body 31' without using the locking step 313.

A plurality of blades 32' collides with the ballast water flowing in the body 31' to generate a vortex, and is integrally formed on the inner surface of the body 31' in such a way as to be inclined at a predetermined angle. Each blade 32' is made of a metallic plate having a predetermined length and has the shape of a curved surface which is formed such that its width is reduced from both sides to the center. A plurality of slits 321' is formed in each blade 32' so as to prevent the blade 32' from separating from the body 31' when the blade 32' collides with the ballast water and thus excessive pressure is exerted on the blade 32'.

Further, a vortex generating unit 3'' according to a further embodiment of the present invention will be described with reference to FIG. 6. The vortex generating unit 3'' includes a body 31'' in and out of which ballast water flows, and a plurality of curved blades 32'' which are formed on the inner circumference of the body 31''.

Although not shown in the drawing, according to another embodiment of the present invention, one or more blades may be formed on the inner circumference of a body in a spiral shape.

Since the principle of generating a vortex in the ballast water flowing into the vortex generating unit 3' using the vortex generating unit 3' according to the present invention is the same as the principle which has been described with reference to FIG. 4, the detailed description of the principle will be omitted herein.

The ultraviolet treatment unit 4 functions to sterilize ballast water, discharged from the vortex generating unit 3, using ultraviolet rays. Referring to FIGS. 7 to 10, the ultraviolet treatment unit 4 includes a body 41, a protective screen 42, an ultraviolet lamp unit 43, a washing unit 44, an ultraviolet intensity meter 45, and a temperature sensor 46. Ballast water flows in and out of the body 41. The protective screen 42 is provided in the body 41 to generate a vortex in the ballast water flowing into the body 41 and remove foreign substances such as shells from the ballast water, thus protecting a sleeve 432 which surrounds an ultraviolet lamp. The ultraviolet lamp unit 43 includes an ultraviolet lamp 431 which radiates ultraviolet rays onto the ballast water passing through the protective screen 42. The washing unit 44 removes foreign substances from the ultraviolet lamp unit 43. The ultraviolet intensity meter 45 measures the intensity of the ultraviolet rays emitted from the ultraviolet lamp 431. The temperature sensor 46 functions to measure the internal temperature of the body 41. As necessary, a plurality of ultraviolet treatment units 4 may be continuously installed in series.

The body 41 defines the body of the ultraviolet treatment unit 4, and may preferably have the shape of a cylinder which has a space therein. The body 41 includes an inlet 411 into which ballast water flows, an outlet 412 through which sterilized ballast water is discharged, and a locking step 413 which is provided around the inlet 411 in such a way as to protrude from the inner circumference of the body 41 and is coupled to the protective screen 42 that will be described below. Preferably, the inlet 411 and the outlet 412 may be formed in a side surface of the cylindrical body 41 in order to increase the effect of sterilizing ballast water passing through the ultraviolet lamp unit 43.

The locking step 413 protrudes from the inner circumference of the body 41 around the inlet 411 and is coupled to the protective screen 42 that will be described below. The locking step 413 has fastening holes 4131 so that it can be fastened to the protective screen 42 using screws.

The protective screen 42 is coupled to a surface of the locking step 413 located at a ballast-water inlet side of the body 41, using screws or by welding, and generates a vortex in the ballast water introduced into the body 41 and removes foreign substances including shells from the ballast water, thus protecting the sleeve 432 that surrounds the ultraviolet lamp 431. The protective screen 42 includes a frame 421 which forms an outer support and a mesh net 422 which is formed inside the frame 421.

The frame 421 forms the outer support in a circular shape, and is coupled to the locking step 413. Fastening holes 4211 are formed in the frame 321 so that the locking step 413 is coupled to the frame 421 using screws.

The mesh net 422 is formed in the frame 421 and includes lateral ribs 4221 and longitudinal ribs 4222 which cross each other, with through holes 4223 being formed between the ribs that cross each other. Each of the ribs 4221 and 4222 forming the mesh net 422 is made of a rectangular plate which is long, and the lateral ribs 4221 or the longitudinal ribs 4222 are installed to have directivity, for example, to be inclined so that the ribs 4221 or 4222 collide with the ballast water flowing into the inlet 411 and change the direction in which the ballast water moves, thus generating a vortex. For example, referring to FIGS. 8 and 9, when the mesh net 422 is divided into four portions, in portion a, the longitudinal ribs 4222 are installed vertically but the lateral ribs 4221 are obliquely installed at a predetermined angle in the direction of 12 o'clock. In portion b, the lateral ribs 4221 are installed vertically but the longitudinal ribs 4222 are inclined at a predetermined angle in the direction of 9 o'clock. In portion c, the longitudinal ribs 4222 are installed vertically but the lateral ribs 4221 are inclined at a predetermined angle in the direction of 6 o'clock. In portion d, the lateral ribs 4221 are installed vertically but the longitudinal ribs 4222 are inclined at a predetermined angle in the direction of 3 o'clock. It is preferable that the lateral or longitudinal ribs 4221 or 4222 of the mesh net 422 be inclined at an angle of 20 to 40 degrees.

The principle according to which a vortex is generated in the ballast water passing through the protective screen 42 is as follows. The ballast water passing through portion a collides with the lateral ribs 4221 which are obliquely installed in the 12 o'clock direction, so that the direction in which the ballast water moves changes into the 12 o'clock direction. The ballast water passing through portion b collides with the longitudinal ribs 4222 which are obliquely installed in the 9 o'clock direction, so that the direction in which the ballast water moves changes into the 9 o'clock direction. The ballast water passing through portion c collides with the longitudinal ribs 4222 which are obliquely installed in the 6 o'clock direction, so that the direction in which the ballast water moves changes into the 6 o'clock direction. The ballast water passing through portion d collides with the lateral ribs 4222 which are obliquely installed in the 3 o'clock direction, so that the direction in which the ballast water moves changes into the 3 o'clock direction. Consequently, the ballast water passing through the protective screen 42 rotates counterclockwise, so that a vortex is generated. As such, a vortex is generated in the ballast water, so that the ballast water moves while swirling and thus the ballast water mixes well. Therefore, a large quantity of ultraviolet rays is radiated onto the ballast water flowing to the ultraviolet lamp unit 43, so that the ballast water treatment device has a high sterilization effect. The sleeve 432 may collide with foreign substances, such as shells, flowing into the body 4 along with the ballast water and thus be damaged. While foreign substances such as shells introduced into the body 4 along with the ballast water are passing through the protective screen 42, the foreign substances are filtered by the protective screen 42 and thus the sleeve 432 is protected.

The ultraviolet lamp unit 43 emits ultraviolet rays and radiates them into the ballast water flowing into the body 41. The ultraviolet lamp unit 43 includes the ultraviolet lamp 431 and the sleeve 432.

The ultraviolet lamp 431 having the shape of a rod or bar is positioned in the body 41. Preferably, a plurality of ultraviolet lamps 431 may be placed at regular intervals in the cylindrical body 41 in such a way as to be parallel to the body 41 in an axial direction thereof. Thereby, the ballast water flowing through the inlet 411 and the outlet 412 may pass by perpendicular to the ultraviolet lamps 431.

The sleeve 432 surrounding the ultraviolet lamp 431 protects the ultraviolet lamp 431. If foreign substances adhere to a surface of the sleeve 432, the intensity of the emitted ultraviolet rays is reduced. Thus, the surface of the sleeve 432 is washed by the washing unit 44. The sleeve 432 may use a pipe which is made of quartz.

The washing unit 44 functions to remove foreign substances from the surface of the sleeve 432. The washing unit 44 includes a wiper 441 which is attached to the outer circumference of the sleeve 432, a driving shaft 442 which is connected to the wiper 441, and a driving motor 443 which is connected to the driving shaft 442 to actuate the driving shaft 442.

The wiper 441 functions to remove foreign substances from the outer circumference of the sleeve 432, and may preferably have an annular shape which surrounds the entire outer circumference of the sleeve 432. The wiper 441 may be made of synthetic resin or synthetic rubber having heat resistance. If there is a plurality of sleeves 432, a plurality of wipers 441 is required. In this case, the wipers 441 may be connected to each other via arms 4411, and the arms 4411 may be connected to the driving shaft 442.

The driving shaft 442 is connected to the wiper 441 and moves the wiper 441 so that it can remove foreign substances from the outer circumference of the sleeve 432. Preferably, the driving shaft 442 may be provided in the central portion of the body 41 in such a way as to be parallel to the body 41 in the axial direction thereof, and the outer circumference of the driving shaft 442 may have thread. The driving shaft 442 is connected at an end thereof to the driving motor 443.

The driving motor 443 is connected to one end of the driving shaft 442 to provide power that operates the driving shaft 442 and the wiper 441. The driving motor 443 may comprise a general motor.

The ultraviolet intensity meter 45 functions to measure the intensity of the ultraviolet rays emitted from the ultraviolet lamp 431, and may be provided on the outer circumference of the body 41 in such a way as to pass through the body 41. Since the ultraviolet intensity meter 45 is connected to the control unit 5, the control unit 5 operates the washing unit 44 when the intensity of the measured ultraviolet rays is less than a predetermined range. The operating principle will be described below in detail.

The temperature sensor 46 functions to measure the internal temperature of the body 41 of the ultraviolet treatment unit 4, and may be provided on the outer circumference of the body 41 or provided in the body 41. Since the temperature sensor 46 is connected to the control unit 5, the control unit 5 stops operating the ultraviolet treatment unit 4 if the internal temperature of the body 41 exceeds a predetermined range.

The operating principle of the ultraviolet treatment unit 4 including the above components will be described below. First, when the ballast water which flows through the inlet 411 into the body 41 passes through the protective screen 42, a vortex is formed in the ballast water. The ballast water is sterilized by the ultraviolet rays which are radiated from the ultraviolet lamp 431, prior to being discharged through the outlet 412. At this time, if foreign substances adhere to the surface of the sleeve 432 surrounding the ultraviolet lamp 431, the intensity of the ultraviolet rays emitted from the ultraviolet lamp 431 is reduced. When the intensity of the ultraviolet rays measured by the ultraviolet intensity meter 45 is reduced under a predetermined range, the washing unit 44 is operated under the control of the control unit 5. While the wiper 441 is moved along the driving shaft 442 by the operation of the driving motor 443, foreign substances are removed from the surface of the sleeve 432. Further, when the internal temperature of the body 41 measured by the temperature sensor 46 exceeds a predetermined range, the control unit 5 stops the operation of the ultraviolet treatment unit 4.

The control unit 5 functions to control the overall operation of the filtering unit 2 and the ultraviolet treatment unit 4. As described above, the control unit 5 is connected to the automatic washing unit 23, the pressure sensor 24, the washing unit 44, the ultraviolet intensity meter 45, and the temperature sensor 46, and transmits signals from and to the above components, thus controlling the overall operation. The control unit 5 may further function to store data and transmit a warning message.

According to another embodiment of the present invention, a display unit 6 may be further provided, which is connected to the control unit 5 to display the operation of the ballast water treatment device. The display unit 6 allows a person concerned to easily visually check the condition of the automatic washing unit 23, the pressure sensor 24, the washing unit 44, the ultraviolet intensity meter 45, and the temperature sensor 46 which are operated under the control of the control unit 5, and the condition of the ballast water which is treated by the filtering unit 2 and the ultraviolet treatment unit 4.

As such, the ballast water treatment device according to an embodiment of the present invention physically filters ballast water using the filter, generates a vortex in the filtered ballast water, and thereafter sterilizes the ballast water using ultraviolet rays, thus preventing secondary contamination attributable to by-products, and preventing the contamination of a ballast tank. Further, the automatic washing of the filtering unit or the ultraviolet treatment unit is possible, so that performance is kept constant and maintenance can be effectively performed. The filtering unit or the ultraviolet treatment unit may be automatically washed without stopping treating the ballast water, so that the efficiency of treatment is increased, and thus it is effective in terms of treatment time and cost. The automatic washing unit of the filtering unit is constructed to simultaneously perform vertical movement and rotary movement, thereby improving the washing ability of the filter. Further, the vortex generating unit is included to uniformly mix the ballast water, thus improving a sterilization effect. Thus, it is possible to manufacture the device so that a distance from the center of the filter to the center of the ultraviolet lamp 431 is within 1.5 m. Therefore, the miniaturization of the ballast water treatment device is achieved, so that an area in which the device is installed can be minimized.

As shown in FIG. 2, the ballast water treatment device according to another embodiment of the present invention may further include a bypass duct 7 between the filtering unit 2 and the vortex generating unit 3 so that the ballast water flows through only either of the filtering unit 2 or the ultraviolet treatment unit 4 to be treated, as necessary.

The bypass duct 7 allows ballast water to flow between the filtering unit 2 and the vortex generating unit 3. Ballast water is treated while passing sequentially through the filtering unit 2 and the ultraviolet treatment unit 4. However, if the bypass duct 7 is installed, the ballast water may pass through only either of the filtering unit 2 or the ultraviolet treatment unit 4 to be treated, as necessary. Particularly in the case of discharging the ballast water stored in the ballast tank 8 to the sea, it is unnecessary for the ballast water to pass through the filtering unit 2. Thus, the ballast water can be discharged after passing through only the ultraviolet treatment unit 4, so that it is effective in terms of treatment time and cost.

A path taken by ballast water introduced into the ballast water treatment device when it is being stored in the ballast tank 8 will be described with reference to FIG. 2. If it is unnecessary to sterilize and filter the introduced ballast water, a first valve 11, a third valve 13, and a fourth valve 14 are closed and a fifth valve 15 is open, so that the ballast water may be directly stored in the ballast tank 8. If it is necessary to filter and sterilize the introduced ballast water, the third and fifth valves 13 and 15 are closed, and the first, second, and fourth valves 11, 12, and 14 are open, so that the introduced ballast water may be stored in the ballast tank 8 after passing through the filtering unit 2 and the ultraviolet treatment unit 4. Further, in the case of merely sterilizing the ballast water, the first, second, and fifth valves 11, 12, and 15 are closed, and the fourth and fifth valves 13 and 14 are open, so that the introduced ballast water may be stored in the ballast tank 8 after having passed through the ultraviolet treatment unit 4.

Hereinafter, the treatment effect obtained when ballast water is treated by the ballast water treatment device according to the embodiment of the present invention shown in FIG. 4 will be described based on comparative experiment data.

[Experiment] Experiment on Microorganism Treating Ability of Ballast Water Treatment Device 1. Object: Verification of microorganism treating ability of ballast water treatment device according to the present invention 2. Subject: 5 or more species of microorganisms and bacteria that belong to 3 different phyla 3. Method: As shown in FIG. 11, an experiment is conducted by experimental equipment using a barge, and the method is shown in FIG. 12.

That is, in a study group, right after ballast water containing 5 or more species of microorganisms and bacteria that belong to 3 different phyla has been treated by the ballast water treatment device according to the present invention, and when 5 days have passed after the treated ballast water was stored in the ballast tank, the ballast water is collected and the quantity of remaining microorganisms is measured.

Meanwhile, in a control group, right before ballast water containing 5 or more species of microorganisms and bacteria that belong to 3 different phyla is stored in the ballast tank without undergoing any additional treatment, and when 5 days have passed after the ballast water was stored in the ballast tank, the water is collected and the quantity of remaining microorganisms is measured.

4. Result: The experimental results are shown in the following table 1.

The control group yields the following results. That is, as for ① microorganisms having size over 50 μm, they are reduced from an initial value, 250,000 $_{Ind/m3}$, to 223,000 $_{Ind/m3}$, and after 5 days have passed, they are reduced to 126,000 $_{Ind/m3}$. As a result, the residual rate of the microorganisms exceeds 50%. As for ②microorganisms of 10 to 50 μm, they are reduced from an initial value, 5,000 $_{Ind/m3}$, to 4,300 $_{Ind/m3}$, and after 5 days have passed, they are reduced to 3,600 $_{Ind/m3}$. As a result, the residual rate of the microorganisms exceeds 70%. Further, as for ③bacteria, they are reduced from an initial value, 2,700 $_{Cfu/100ml}$ to 1,800 $_{Cfu/100ml}$, and after 5 days have passed, they are present in the remaining quantity of 235 $_{Cfu/100ml}$.

In contrast, the study group yields the following results. That is, as for ①microorganisms having size over 50 μm, the microorganisms having the initial value of 250,000 $_{Ind/m3}$ are reduced to 600 $_{Ind/m3}$ after treatment, and are reduced to 0 $_{Ind/m3}$ after 5 days have passed. As such, the residual rate of the microorganisms is 0%, which perfectly satisfies the IMO requirements requiring 10 $_{Ind/m3}$ or less. As for ②microorganisms of 10 to 50 μm, the microorganisms having the initial value of 5,000 $_{Ind/m3}$ are reduced to 200 $_{Ind/m3}$ after treatment, and are reduced to 0 $_{Ind/m3}$ after 5 days have passed. As such, the residual rate of the microorganisms is 0%, which perfectly satisfies the IMO requirements requiring 10 $_{Ind/m3}$ or less. Further, as for CD bacteria, the bacteria having the initial value of 2,700 $_{Cfu/100ml}$ are reduced to 23 $_{Cfu/100ml}$ after treatment, and are present in the remaining quantity of 7 $_{Cfu/100ml}$ after 5 days have passed. Consequently, it can be seen that the remaining quantity of the bacteria perfectly satisfies the IMO requirements requiring 250 $_{Cfu/100ml}$ or less.

TABLE 1

| Organism Type | unit | Initial | Control Day 0 | Control Day 5 | Treated Day 0 | Treated Day 5 | IMO Req |
|---|---|---|---|---|---|---|---|
| Organisms >50 μm | Ind/m3 | 250,000 | 223,000 | 126,000 | 600 | 0 | >10 |
| Organisms 10-50 μm | Ind/m3 | 5,000 | 4,300 | 3,600 | 200 | 0 | >10 |
| E-coli bacteria | Cfu/100 ml | 2,700 | 1,800 | 235 | 23 | 0 | >250 |

As described above, the present invention provides a ballast water treatment device, which uses a method of physically filtering ballast water using a filter and a method of sterilizing the ballast water using ultraviolet rays in combination, thus preventing secondary contamination resulting from by-products, preventing a ballast tank from becoming contaminated, affording effective maintenance, and making it convenient to control.

Further, the present invention provides a ballast water treatment device, which includes a vortex generating unit between a filtering unit and an ultraviolet treatment unit to generate an artificial vortex in ballast water fed from the filtering unit and thus allow the ballast water to be uniformly mixed, thus enabling a large quantity of ultraviolet rays to be radiated onto the ballast water which is passing through the ultraviolet treatment unit, therefore improving a sterilization effect.

Further, the present invention provides a ballast water treatment device, which includes a vortex generating unit that uniformly mixes the ballast water and thus improves a sterilization effect, thus enabling a distance between the center of a filter and the center of an ultraviolet lamp to be set to 1.5 m or less, therefore realizing the miniaturization of the ballast water treatment device and minimizing the area in which the device is installed.

Further, the present invention provides a ballast water treatment device, in which an ultraviolet treatment unit includes a protective screen to generate a vortex in the ballast water entering the ultraviolet treatment unit, thus enabling a large quantity of ultraviolet rays to be radiated onto the ballast water so as to improve a sterilization effect, and thus removing foreign substances such as a shell from the ballast water so as to protect a sleeve which surrounds an ultraviolet lamp.

Further, the present invention provides a ballast water treatment device, which further includes a bypass duct between a filtering unit and a vortex generating unit so that ballast water passes through only either of the filtering unit or the ultraviolet treatment unit to be treated, as necessary.

Further, the present invention provides a ballast water treatment device, which allows a filtering unit or an ultraviolet treatment unit to be automatically washed, thus always maintaining uniform performance, and affording efficient maintenance.

Further, the present invention provides a ballast water treatment device, which allows a filtering unit or an ultraviolet treatment unit to be automatically washed without stopping treating ballast water, thus increasing treatment efficiency, therefore being efficient in terms of treatment time and cost.

Further, the present invention provides a ballast water treatment device, which is constructed to allow an automatic washing unit of a filtering unit to simultaneously perform vertical movement and rotary movement, thus increasing the washing ability of a filter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A ballast water treatment device, comprising:
A filtering unit filtering ballast water introduced into a ship using a filter;
A vortex generating unit generating an artificial vortex in the ballast water filtered by the filtering unit;
An ultraviolet treatment unit having an ultraviolet lamp which sterilizes the ballast water discharged from the vortex generating unit using ultraviolet rays; and
A protective screen provided on a front end of the ultraviolet treatment unit, said protective screen generating a vortex in ballast water and removing foreign substances from the ballast water, thus protecting the ultraviolet treatment unit, wherein the protective screen comprises a mesh net formed by crossing lateral and longitudinal ribs with each other, and the lateral and longitudinal ribs are placed obliquely at a predetermined angle to collide with the ballast water which flows in a body of the ultraviolet treatment unit, thus changing a direction in which the ballast water moves, therefore generating a vortex;
Whereby the ballast water is uniformly mixed by the vortex generated by the vortex generating unit, so that a steril- ization effect is enhanced, and a distance between the filtering unit and the ultraviolet treatment unit is reduced, so that compactness of the ballast water treatment device is realized.

2. The ballast water treatment device as set forth in claim 1, wherein the filtering unit comprises:
   A body having an inlet and an outlet to permit inflow and outflow of ballast water;
   A filter filtering the ballast water which flows in the body; and
   An automatic washing unit washing away foreign substances from the filter.

3. The ballast water treatment device as set forth in claim 2, wherein the automatic washing unit comprises:
   a driving unit driving the automatic washing unit;
   a suction unit connected to the driving unit to be moved by the driving unit and sucking the foreign substances from the filter; and
   an exhaust unit discharging the foreign substances which have been sucked by the suction unit.

4. The ballast water treatment device as set forth in claim 3, wherein
   the driving unit comprises:
      a driving motor providing power to actuate the automatic washing unit; and
      a driving shaft connected to the driving motor,
   the suction unit comprises:
      a suction rod sucking foreign substances from the filter; and
      a core connected to the suction rod to move the sucked foreign substances, and connected to the driving unit, and
   the exhaust unit comprises:
      a flushing chamber storing foreign substances which are discharged through an exhaust hole formed in a first end of the core;
      an exhaust pipe serving as a passage which discharges the foreign substances from the flushing chamber; and
      an exhaust valve provided at a predetermined position of the exhaust pipe,
   whereby the foreign substances adhering to the filter are automatically sucked and discharged using a difference in pressure when the exhaust valve is open and closed.

5. The ballast water treatment device as set forth in claim 4, wherein the driving shaft has thread, and the suction rod is radially connected to the core, so that the suction unit is moved up and down while being rotated by an operation of the driving unit, thus allowing the foreign substances to be more efficiently sucked from the filter.

6. The ballast water treatment device as set forth in claim 1, wherein the vortex generating unit comprises:
   A body having an inlet and an outlet to permit inflow and outflow of ballast water, and a locking step protruding from an inner circumference of the body; and
   A vortex generator supported by the locking step and generating a vortex in the ballast water which flows in the body, the vortex generator comprising:
   A frame defining an outer support, and coupled to the locking step; and
   A plurality of blades formed by cutting a surface which is on the same plane as the frame to a predetermined radius and bending the cut surface in a predetermined direction.

7. The ballast water treatment device as set forth in claim 1, wherein the vortex generating unit comprises:
   A body having an inlet and an outlet to permit inflow and outflow of ballast water; and
   A plurality of blades provided on an inner circumference of the body in such a way as to be inclined at a predetermined angle,
   Whereby the ballast water flowing in the body collides with the blades, thus generating a vortex.

8. The ballast water treatment device as set forth in claim 1, wherein the ultraviolet treatment unit comprises:
   A body having an inlet and an outlet to permit inflow and outflow of ballast water;
   An ultraviolet lamp unit having an ultraviolet lamp which radiates ultraviolet rays onto the ballast water flowing in the body; and
   A washing unit removing foreign substances from the ultraviolet lamp unit.

9. The ballast water treatment device as set forth in claim 8, wherein the washing unit comprises:
   a wiper wiping an outer circumference of the ultraviolet lamp unit;
   a driving shaft connected to the wiper; and
   a driving motor connected to the driving shaft to actuate the driving shaft.

10. The ballast water treatment device as set forth in claim 8, wherein the ultraviolet treatment unit further comprises:
    an ultraviolet intensity meter measuring intensity of ultraviolet rays emitted from the ultraviolet lamp; and
    a temperature sensor measuring internal temperature of the body.

11. The ballast water treatment device as set forth in claim 10, further comprising:
    a bypass duct provided between the filtering unit and the vortex generating unit so that ballast water passes through only either of the filtering unit or the ultraviolet treatment unit to be treated, as necessary.

12. The ballast water treatment device as set forth in claim 11, further comprising:
    a display unit displaying an operation of the ballast water treatment device.

* * * * *